(12) United States Patent
Di et al.

(10) Patent No.: US 11,095,936 B2
(45) Date of Patent: Aug. 17, 2021

(54) STREAMING MEDIA TRANSMISSION METHOD AND CLIENT APPLIED TO VIRTUAL REALITY TECHNOLOGY

(71) Applicant: HUAWEI TECHNOLOGIES CO., LTD., Guangdong (CN)

(72) Inventors: Peiyun Di, Shenzhen (CN); Qingpeng Xie, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/503,565

(22) Filed: Jul. 4, 2019

(65) Prior Publication Data

US 2019/0349627 A1    Nov. 14, 2019

Related U.S. Application Data

(63) Continuation of application No. PCT/CN2017/098289, filed on Aug. 21, 2017.

(30) Foreign Application Priority Data

Jan. 6, 2017  (CN) .......................... 201710011452.3

(51) Int. Cl.
*H04N 21/438* (2011.01)
*H04L 29/06* (2006.01)
(Continued)

(52) U.S. Cl.
CPC ... *H04N 21/4384* (2013.01); *H04L 29/06034* (2013.01); *H04L 67/38* (2013.01);
(Continued)

(58) Field of Classification Search
CPC . H04L 67/38; H04L 29/06034; H04N 21/422; H04N 21/2353; H04N 21/4384;
(Continued)

(56) References Cited

U.S. PATENT DOCUMENTS 9,059,942 B2 *  6/2015  Boldyrev ................ H04L 47/70
9,881,417 B2 *  1/2018  Utsugi .................... G06T 17/10
(Continued)

FOREIGN PATENT DOCUMENTS

CN    102217322 A   10/2011
CN    103905924 A    7/2014
(Continued)

OTHER PUBLICATIONS

ISO/IEC 23009-1: Information technology—Dynamic adaptive streaming over HTTP (DASH)—Part 1: Media presentation description and segment formats.2014. total 152 pages.
(Continued)

*Primary Examiner* — Azizul Choudhury
(74) *Attorney, Agent, or Firm* — Womble Bond Dickinson (US) LLP

(57) ABSTRACT

Embodiments of the present invention describe streaming media transmission methods and apparatus applied to a virtual reality technology. A method for streaming media transmissions may include sending a media information obtaining request to a server, where the media information obtaining request includes client capability information and auxiliary information, the client capability information indicates that the client supports reception of data pushed by the server, and the auxiliary information indicates an attribute that the client supports virtual reality presentation. The method may also include receiving a media presentation description and media data, where the media presentation description and the media data are sent by the server after the server responds to the media information obtaining request. According to the streaming media transmission methods and apparatus applied to a virtual reality technology in the embodiments of the present invention, a transmission delay
(Continued)

can be reduced, and transmission efficiency can be improved.

18 Claims, 7 Drawing Sheets

(51) Int. Cl.
  *H04N 21/235* (2011.01)
  *H04N 21/258* (2011.01)
  *H04N 21/422* (2011.01)
  *H04N 21/4728* (2011.01)

(52) U.S. Cl.
  CPC ... *H04N 21/2353* (2013.01); *H04N 21/25825* (2013.01); *H04N 21/422* (2013.01); *H04N 21/4728* (2013.01); *G05B 2219/32246* (2013.01); *G05B 2219/40131* (2013.01)

(58) Field of Classification Search
  CPC ......... H04N 21/4728; H04N 21/25825; G05B 2219/40131; G05B 2219/32246
  See application file for complete search history.

(56) References Cited

U.S. PATENT DOCUMENTS

| | | | |
|---|---|---|---|
| 2012/0026166 A1* | 2/2012 | Takeda | A63F 13/92 345/419 |
| 2013/0195204 A1 | 8/2013 | Reznik et al. | |
| 2014/0089398 A1 | 3/2014 | Zhang et al. | |
| 2014/0120887 A1* | 5/2014 | Huang | G06F 3/011 455/414.1 |
| 2014/0333667 A1* | 11/2014 | Jung | G06T 11/00 345/633 |
| 2017/0111595 A1* | 4/2017 | Soni | G09G 5/14 |
| 2017/0244951 A1* | 8/2017 | Ha | H04N 5/23238 |
| 2017/0316186 A1* | 11/2017 | Breitenfeld | G06F 21/6218 |
| 2018/0150982 A1* | 5/2018 | Lee | G06Q 40/12 |
| 2019/0311548 A1* | 10/2019 | Wang | G06T 15/506 |

FOREIGN PATENT DOCUMENTS

| | | |
|---|---|---|
| CN | 104067628 A | 9/2014 |
| CN | 104954354 A | 9/2015 |
| CN | 105408916 A | 3/2016 |
| CN | 105915937 A | 8/2016 |
| CN | 106101847 A | 11/2016 |
| WO | 2015014773 A1 | 2/2015 |
| WO | 2016130749 A1 | 8/2016 |
| WO | 2018012888 A1 | 1/2018 |

OTHER PUBLICATIONS

ISO/IEC 14496-12 Fifth edition, Information technology—Coding of audiovisual objects—Part 12: ISO base media file format, Dec. 15, 2015, total 248 pages.

ISO/IEC 13818-1 Second edition, Information technology—Generic coding of moving pictures and associated audio information: Systems, Dec. 1, 2000, total 174 pages.

Polin Lai et al: "Push mechanism for VR streaming", Motion Picture Expert Group or ISO/IEC JTC1/SC29/WG11 No. m38958, Sep. 20, 2016. XP030067306, total 6 pages.

Byeongdoo Choi et al: "OMAF:Generalized projection scheme for VR geometries", Motion Picture Expert Group or ISO/IEC JTC1/SC29/WG11 No. m39358, Oct. 12, 2016. XP030067704, total 13 pages.

Emmanual Thomas et al. "Initial gap analysis for simple streaming of 360 media with DASH", Motion Picture Expert Group or ISO/IEC JTC1/SC29/WG11 No. N16520, Oct. 21, 2016, XP030023192. total 7 pages.

Viswanathan (Vishy) Swaminathan (Adobe) et al.:"Draft International Standard for 23009-6: DASH with Server Push and WebSockets", International Organization for Standardization Organisation Internationale De Normalisation ISO/IEC JTC1/SC29/WG11 Coding of Moving Pictures and Associated Audio, No. N16472, Oct. 31, 2016, total 47 pages. XP030023144.

* cited by examiner

Yawing angle α, pitch angle β, and roll angle θ

STREAMING MEDIA TRANSMISSION METHOD AND CLIENT APPLIED TO VIRTUAL REALITY TECHNOLOGY

CROSS-REFERENCE TO RELATED APPLICATIONS

This application is a continuation of International Application No. PCT/CN2017/098289, filed on Aug. 21, 2017, which claims priority to Chinese Patent Application No. 201710011452.3, filed on Jan. 6, 2017. The disclosures of the aforementioned applications are hereby incorporated by reference in their entireties.

TECHNICAL FIELD

The present disclosure relates to the field of streaming media data processing, and in particular, to a streaming media transmission method and client applied to a virtual reality technology.

BACKGROUND

A virtual reality (VR) technology is a computer simulation system that can create and experience a virtual world, uses a computer to generate a simulation environment, and is system simulation of interactive three-dimensional dynamic vision and entity behavior characterized by multi-source information fusion. This enables a user to be immersed in the environment. VR mainly includes aspects such as a simulation environment, a perception, a natural skill, and a sensing device. The simulation environment is a real-time dynamic three-dimensional vivid image generated by a computer. The perception means that ideal VR should have all perceptions that a person has. In addition to the visual perception generated by using a computer graphic technology, perceptions such as a sense of hearing, a sense of touch, a sense of force, and movement are included, and even a sense of smell, a sense of taste, and the like are also included, and are also referred to as multi-sensing. The natural skill means a head rotation, eyes, a gesture, or another human behavior and act of a person, and a computer processes data adapted to an act of a user, makes a real-time response to input of the user, and feeds back the response to facial features of the user separately. The sensing device is a three-dimensional interactive device. When a VR video (or a 360-degree video or an omnidirectional video) is presented on a head-mounted device and a handheld device, only a video image of a position corresponding to the head of the user and associated audio are presented.

With increasing development and improvement of VR technology, a growing quantity of viewing applications of VR videos such as a 360-degree viewing angle are presented to users. Content of an omnidirectional VR video covers an entire 360-degree field of view of a user. To provide immersed experience for the viewer, video content needs to be presented to the user in a same direction as that in a coordinate system of the earth. That is, top and bottom directions in the video content presented to the user are consistent with those of objects in the nature.

During viewing of a VR video, a visual angle range of a user may be usually approximately 120 degrees*120 degrees. FIG. 1 is a schematic diagram of a 360-degree video. A left dark frame and a right light frame are respectively space regions corresponding to two visual angles. A user A may select to view video content in the left dark frame, and a user B may select to view video content in the right light frame. The user A may further select to switch the visual angle, to switch from viewing the video content in the left dark frame to viewing the video content in the right light frame.

A streaming media transmission technology is a technology in which a succession of media data is compressed, and then the data is sent by using a network segment and is transmitted on the network for playback on a client. Streaming media transmission includes two manners: progressive streaming and real-time streaming. Streaming media transmission protocols mainly include a hypertext transfer protocol (HTTP), a real-time transport protocol (RTP), a real-time transport control protocol (RTCP), a resource reservation protocol (RSVP), a real-time streaming protocol (RTSP), a routing table maintenance protocol (RMTP), and the like.

The moving picture experts group (MPEG) organization approved the dynamic adaptive streaming over HTTP (DASH) standard in November 2011. The DASH standard is a technical specification for transmission of a media stream based on the HTTP protocol (which is referred to as a DASH technical specification below). The DASH technical specification mainly includes two parts: a media presentation description (MPD) and a media file format (also referred to as file formal). In the DASH standard, the media presentation description is referred to as an MPD. The MPD may be an extensible markup language (xml) file. Information in the file is described at levels. As shown in FIG. 2, previous-level information is completely inherited by a next level. Some media metadata is described in the file. The metadata can enable a client to understand media content information in a server. In addition, the information may be used to construct an http-URL for requesting a segment.

In the DASH standard, a media presentation is a set of structured data presenting media content. The media presentation description is a file describing the media presentation in a standardized manner, and is used to provide a streaming media service. For a period, a group of consecutive periods form the entire media presentation, and the periods are consecutive and do not overlap. A representation is a structured data set encapsulated with one or more media content components (a single type of encoded media such as audio and a video) having descriptive metadata. To be specific, the representation is a set and an encapsulation of one or more bitstreams in a transmission format. One representation includes one or more segments. An adaptation set represents a set of a plurality of alternative encoding versions of a same media content component. One adaptation set includes one or more representations. A subset is a combination of a group of adaptation sets. When playing all the adaptation sets in the subset, a player may obtain corresponding media content. Segment information is referenced media unit of an HTTP uniform resource locator in the media presentation description. The segment information describes a segment of media data. The segment of the media data may be stored in a file, or may be separately stored. In a possible manner, the segment of the media data is stored in the MPD. In a corresponding MPD, URL-related information of a segment is described in several manners. In a manner, the related information of the segment is described in a form of a template or a list. In another manner, the related information of the segment is described by using an index segment. Information such as a byte offset, a size, and duration of the segment in a file storing the segment is described in the index segment, where the segment is stored in the file.

For related technical concepts of an MPEG-DASH technology, refer to related regulations in ISO/IEC 23009-1: 2014 Information technology—Dynamic adaptive streaming over HTTP (DASH)—Part 1: Media presentation description and segment formats, or refer to related regulations in historical standard versions such as ISO/IEC 23009-1:2013 or ISO/IEC 23009-1:2012.

FIG. 3 describes a prior file transfer method based on a streaming media technology, as shown in FIG. 3.

Step 1: Request a media presentation description (PD).

A client sends an http-get request to a server, to request an MPD file of a desired program.

Step 2: Send the MPD in response to the request of a client.

The server side receives the http-get request of the client, and sends an MFD file to the client.

Step 3: Parse the MPD, and select a to-be-requested segment.

After receiving the MPD file, the client parses the MPD file, and obtains information about each representation. A proper representation is selected based on a situation of the client, for example, a decoding capability of the client and a bandwidth of the client.

Step 4: Request the segment.

The client requests a segment corresponding to the representation.

Step 5: Send the segment in response to the request of the client.

After receiving the request of the client, the server sends the segment to the client.

Step 6: The client decodes the segment and performs presentation.

After parsing the received segment, the client sends video data obtained through the parsing to a decoder, and the video data is decoded and then presented.

In the foregoing steps, the client receives the segment after two round-trip times (RTT). The first RTT is a delay from step 1 to step 2, and the second RTT is a delay from step 4 to step 5. In a current network environment, a delay of one RTT approximately ranges from 50 ms to 200 ms. That is, at an initial stage of the client, a delay of requesting data is approximately between 100 ms and 400 ms. When a VR video is played, and particularly in scenarios in which the VR video is rapidly presented or a visual angle of a user is switched, the range of the delay results in very poor user experience.

SUMMARY

To resolve the foregoing technical problem, a first aspect of embodiments of this application provides a streaming media transmission method applied to a virtual reality technology. The method includes:

sending, by a client, a media information obtaining request to a server, where the media information obtaining request includes client capability information and auxiliary information, the client capability information indicates that the client supports reception of data pushed by the server, and the auxiliary information indicates an attribute that the client supports virtual reality presentation; and receiving, by the client, a media presentation description and media data, where the media presentation description and the media data are sent by the server after the server responds to the media information obtaining request.

In a possible embodiment, the client receives the media data. In this embodiment, the client may obtain the media presentation description in another manner (an embodiment other than the manner in which the server responds to the media information obtaining request, for example, the client sends a new request), or may not obtain the media presentation description.

If the client receives the media presentation description, the client may request subsequent data based on the media presentation description.

According to the streaming media transmission method in this embodiment of the present invention, the media information obtaining request sent by the client to the server includes the auxiliary information indicating that the client supports the attribute presented by the virtual reality. The server may determine corresponding media data based on the auxiliary information, and sends the media data to the client, so that the client does not need to send a new request for the media data, to effectively reduce a transmission delay.

In a possible embodiment of the present invention, the media information obtaining request is a hypertext transfer protocol (HTTP)-based request, for example, may be an HTTP GET request.

In a possible embodiment, the media information obtaining request includes uniform resource locator (URL) information, and the client capability information and the auxiliary information are parameters in the uniform resource locator information.

In a possible embodiment of the present invention, the client capability information may be information specified according to the ISO/IEC DIS 23009-6 Information technology—Dynamic adaptive streaming over HTTP (DASH)—Part 6: DASH with server push and websockets, for example, indication information indicating accepting of push (push), or indication information that is in another form and that indicates that the client supports a push service.

In an example, an example of the client capability information included in the media information obtaining request is as follows:

Accept-Push-Policy: "urn:mpeg:dash:fdh:2016:push-fast-start"; type="video"; bitrate="2000000"; height="720"; B="5000000".

Accept-Push-Policy represents that the client may have a capability to receive information pushed by the server, and urn:mpeg:dash:fdh:2016:push-fast-start represents that the client supports fast presentation in a push form. These two types of information may both be used to represent that the client supports the push service.

Type="video" represents that a type of data requested by the client is a video, bitrate="2000000" represents that a bandwidth of the client does not exceed 2 Mbps; height="720" represents that a resolution supported by the client does not exceed 720 pixels (pixels); B="5000000" represents that the client can receive a maximum of 5 Mbytes of media segment data. These types of information are mainly used to represent a transmission attribute supported by the client and do not represent the attribute of supporting virtual reality presentation.

It may be understood that the client capability information may alternatively include only one or more types of information in the foregoing examples. The foregoing examples are examples used for only helping understand this embodiment of the present invention rather than a specific limitation to this embodiment of the present invention.

In a possible embodiment of the present invention, the auxiliary information includes at least one of the following information: viewpoint information, visual angle information, projection mode information, and/or streaming mode information.

In an embodiment of the present invention, the viewpoint information represents a viewpoint at which a user views a 360-degree video. For example, as shown in FIG. 4, a point O represents an origin (which is usually used to represent a location of the user) of a spherical space coordinate system of the 360-degree video, and a point P represents the viewpoint of the user. The viewpoint information may be represented by using coordinates of the point P on a spherical surface, for example, represented by latitude and longitude information of the point P, or a pitch angle, a yawing angle, or a roll angle of the point P, or an angle between a horizontal plane in FIG. 4 and a connection line PO between the point P and the sphere center O or an angle between a vertical plane in FIG. 4 and a connection line PO between the point P and the sphere center O. It may be understood that the point P is a specific example for helping understand the viewpoint in this embodiment of the present invention rather than a specific limitation to the present invention. The viewpoint may alternatively be any point at spherical coordinates corresponding to a VR video.

The yawing angle, the pitch angle, and the roll angle may be used to represent a posture of an object in an inertial coordinate system, and may also be referred to as an Euler angle. In a possible embodiment, information such as yawing angle information, pitch angle information, and roll angle information may be information using an angle as a unit, or may be information using a pixel as a unit, or may be data using a block having a size as a unit. In an example, as shown in FIG. 5, the yawing angle is α, the pitch angle is β, and the roll angle is θ.

In a possible embodiment of the present invention, the visual angle information includes visual angle location information or visual angle type information.

The visual angle information may represent coverage of a visual angle of the user in the 360-degree video. The following provides specific examples of the visual angle with reference to FIG. 6 to FIG. 8. In FIG. 6 to FIG. 8, a dashed area of a spherical surface is a visual angle range. Vertexes at four angles of the visual angle range respectively are B, E, G, and I. In FIG. 6, the vertexes B, E, G, I are intersection points that are on the spherical surface and that are of a circular ring passing through the sphere center and a circular ring parallel to coordinate axes x-axis and y-axis. In FIG. 7, the vertexes B, E, G, I are intersection points of four circular rings passing through the sphere center on the spherical surface, and every two of the circular rings have a same diameter. In FIG. 8, the vertexes B, E, G, I are intersections points of two parallel circular rings on the spherical surface. A point C on the spherical surface is a central location point of the visual angle, and the point O is the sphere center. Angles corresponding to a DH side and an AF side are a height and a width of the visual angle. A BI side, an EG side, and the DH side correspond to a same angle. A BE side, an IG side, and the AF side correspond to a sane angle. Vertexes of a width angle and a height angle are on a Z-axis. In FIG. 6, a vertex of the angle corresponding to the BE side is J, J is an intersection point of the z-axis and a circular ring in which BE is located, and a vertex of the angle corresponding to the BI side is the point O. A method for obtaining a point J and a point L in FIG. 7 is the same as the method for obtaining the point J in FIG. 6. A vertex of an angle corresponding to a BE side is the point J, and a vertex of an angle corresponding to a BI side is the point L. In FIG. 8, each of a vertex corresponding to the BE side and a vertex corresponding to the BI side is the point O. In FIG. 6 to FIG. 8, the visual angle information includes information about the point C, width information, height information, and the visual angle type information. A visual angle type includes a visual angle determined based on a visual angle range determining manner shown in FIG. 6 to FIG. 8.

After obtaining the viewpoint information or the visual angle information of the client, the server selects a representation related to the viewpoint information or the visual angle information. The representation related to the viewpoint information or the visual angle information is a representation of a space video corresponding to the viewpoint or the visual angle, or is a tile representation related to the viewpoint information the visual angle information, or is an omnidirectional VR video (namely, a 360-degree video). Video data of an omnidirectional VR video may be divided into a plurality of tiles, each tile is described by using a tile representation after the tile is independently encoded, and video data corresponding to the tile representation is a part of the data of the omnidirectional VR video.

When VR video content is prepared, the server may encode all frames of the VR video. Video quality of some of the encoded frames may be high. Alternatively, VR video frames may be divided into a plurality of tiles, and each tile corresponds to a part of space region in the VR video. During encoding, a representation is independently prepared for each tile. The server selects representations of one or more tiles related to the view point or the visual angle. Tile division in the VR video may be shown in FIG. 9. In FIG. 9, a spherical space region is first mapped into a plane, and then the plane is divided into nine space regions. There have been many manners in which a spherical surface is mapped into a plane. In an example in FIG. 9, the tile division is described by using only equirectangular projection. In some systems, another projection mode also supports the tile division, and details are not described herein. After determining the representation, the server sends some data of the representation or data in a period of time to the client.

In a possible embodiment of the present invention, the viewpoint information or the visual angle information may be carried in a fast presentation parameter set (FastStartParams) sent by the client to the server, or may be carried in a uniform resource locator (URL) parameter. For example, a parameter whose parameter name is viewpoint, field of vision (FOV), or region of interest (ROI) is added to represent the viewpoint or the visual angle. A value of viewpoint may be the information about the point P in the foregoing embodiment. Information about FOV or ROI may be description information of the visual angle in the foregoing embodiment.

In an example of an embodiment of the present invention, an example of a media obtaining request sent by the client to the server is as follows:

Accept-Push-Policy: "urn:mpeg:dash:fdh:2016:push-fast-start"; type="video"; bitrate="2000000"; height="720"; B="5000000"; viewpoint="30,45", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video: bitrate="2000000" represents that a bandwidth of the client does not exceed 2 Mbps; height="720" represents that a resolution supported by the client does not exceed 720 pixels; B="5000000" represents that the client can receive a maximum of 5 Mbytes of media segment data; and viewpoint="30,45" is the viewpoint information, and represents viewpoint coordinates of the user.

The server may make the following response for the request of the client:

Push-Policy: "urn:mpeg:dash:fdh:2016:push-fast-start"; type="video"; bitrate="1800000"; B="3000000"; viewpoint="30,45", where Push-Policy represents that the server supports in pushing data to the client; "urn:mpeg:dash:fdh:2016:push-fast-start" represents that the data pushed by the server to the client supports fast presentation of the client; type="video" represents that a type of the pushed data is a video; bitrate="1800000" represents a bandwidth of pushed data is 1.8 Mbps; B="3000000" represents that the pushed data is 3 Mbytes of media segment data; and viewpoint="30,45" is the viewpoint information, and represents that the pushed data covers the viewpoint coordinates.

In an embodiment, the server may alternatively send video data directly to the client without sending the response.

In a scenario in which the client starts the VR video for viewing or the user switches the visual angle, the viewpoint information or the visual angle information is added to the request, so that the server can fast determine a representation or video data that is needed by the client, to perform pushing to the client, reduce a quantity of requests of the client, and effectively reduce a delay.

In an example of an embodiment of the present invention, an example of a media obtaining request sent by the client to the server is as follows:

Accept-Push-Policy: "urn:mpeg:dash:fdh:2016:push-fast-start"; type="video"; bitrate="2000000"; height="720"; B="5000000"; FOV="30,45,120,120", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video; bitrate="2000000" represents that a bandwidth of the client does not exceed 2 Mbps; height="720" represents that a resolution supported by the client does not exceed 720 pixels (pixels); B="5000000" represents that the client can receive a maximum of 5 Mbytes of media segment data; and FOV="30,45,120,120" is the visual angle information, and represents the visual angle range of the user.

The server may make the following response for the request of the client:

Push-Policy: "urn:mpeg:dash:fdh:2016:push-fast-start"; type="video"; bitrate="1800000"; B="3000000"; FOV="30,45,120,120", where Push-Policy represents that the server supports in pushing data to the client; "urn:mpeg:dash:fdh:2016:push-fast-start" represents that the data pushed by the server to the client supports fast presentation of the client; type="video" represents that a type of the pushed data is a video; bitrate="1800000" represents a bandwidth of pushed data is 1.8 Mbps; B="3000000" represents that the pushed data is 3 Mbytes of media segment data; and FOV="30,45,120,120" represents the visual angle information, 30,45 is center point information of the visual angle, and 120,120 is a width and a height of the visual angle; the visual angle may also be represented as FOV="3,45,120,120,2", where 2 in the information represents a visual angle type, for example, the visual angle type represented by 2 is the visual angle described in FIG. 7.

In an embodiment, the server may alternatively send video data directly to the client without sending the response.

In a possible embodiment of the present invention, a projection mode indicated by the projection mode information includes at least one of the following: spherical projection, cylindrical projection, equirectangular projection, cubic projection, octahedral projection, icosahedral projection, equal-area projection, or segmented sphere projection.

The client may send a projection mode supported by the client to the server. In the VR video, each VR frame is a spherical surface. However, existing encoding and processing technologies are all performed based on a plane. Therefore, before a spherical VR frame is encoded, a spherical surface is mapped into a plane. A typical projection mode includes equirectangular projection, cubic projection, cylindrical projection, and the like.

In a possible embodiment, an added parameter name may be protectType, and a value of the parameter may be an English full name of the projection mode, or may be an abbreviation, or may be a pre-defined code word.

In a specific example, the media information obtaining request sent by the client to the server is as follows:

Accept-Push-Policy: "urn:mpeg:dash:fdh:2016:push-fast-start"; type="video"; bitrate="2000000"; height="720"; B="5000000"; projectType="cube,erp", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video: bitrate="2000000" represents that a bandwidth of the client does not exceed 2 Mbps; height="720" represents that a resolution supported by the client does not exceed 720 pixels (pixels); B="5000000" represents that the client can receive a maximum of 5 Mbytes of media segment data; and projectType="cube,erp" is the projection mode information, and represents the projection mode supported by the client. In this example, the projection mode is cubic projection and equirectangular projection.

The server may send the following response to the client for the request:

Push-Policy: "urn:mpeg:dash:fdh:2016:push-fast-start"; type="video"; bitrate="1800000"; B="3000000"; projectType="erp", where Push-Policy represents that the server supports in pushing data to the client; "urn:mpeg:fdh:2016:push-fast-start" represents that the data pushed by the server to the client supports fast presentation of the client; type="video" represents that a type of the pushed data is a video; bitrate="1800000" represents a bandwidth of pushed data is 1.8 Mbps; B="3000000" represents that the pushed data is 3 Mbytes of media segment data; and projectType="erp" represents that the projection mode of the data is equirectangular projection.

In a possible manner, the server may alternatively send video data directly to the client without sending the response.

The projection mode information is added to information sent by the client to the server, so that when there are a plurality of projection mode representations in the server, the server can fast determine a projection mode representation supported by the client, and push data of the representation to the client, thereby reducing a delay of interaction between the client and the server.

In a possible embodiment of the present invention, a streaming mode indicated by the streaming mode information includes at least one of the following modes: a tile mode or a full frame mode.

The client sends a streaming mode supported by the client to the server. During transmission of the VR video, there may be two video stream transmission modes. In one mode, content of a VR video frame is all transmitted to the client (the full frame mode). In the other mode, content of the VR video is divided into a plurality of tiles, and corresponding content of each tile is independently encoded (the tile mode). During transmission, a representation of a tile of content related to the visual angle of the client may be sent to the client. A division manner may be shown in FIG. 9. In an embodiment, the server may simultaneously transmit data of a low-quality and complete VR video frame and data of at least one high-quality tile.

In a possible embodiment, an added parameter name may be streamType, and a value of the parameter may be an English full name of the transmission mode, or may be an abbreviation, or may be a pre-defined code word.

In a specific example, an example of the media information obtaining request sent by the client is as follows:
Accept-Push-Policy: "urn:mpeg:dash:fdh:2016:push-fast-start"; type="video"; bitrate="200000"; height="720"; B="5000000"; streamType="tile".

The client requests video data from the server. A quantity of requested bytes is 5 MBytes, a maximum requested resolution is 720 p, and a maximum bit rate is 2 Mbps. The transmission mode supported by the client is the tile mode.

The server may send the following response to the client for the request:
Push-Policy: "urn:mpeg:dash:fdh:2016:push-fast-start"; type="video"; bitrate="1800000"; B="3000000"; streamType="tile".

The server sends 3 MBytes of video data to the client. The bit rate is 1.8 Mbps, and transmitted data is tile data.

For a meaning of another field in the foregoing example, refer to a corresponding part in the foregoing example. Details are not described herein again.

In a possible manner, the server may alternatively send video data directly to the client without sending the response.

The streaming mode information is added to the request sent by the client to the server, so that when the server supports a plurality of streaming modes, the server can fast determine a streaming mode representation that can be supported by the client, and push data of the representation to the client, thereby reducing a delay of interaction between the client and the server.

In a possible embodiment, request information of the client may not carry one or more pieces of information of type=" ", bitrate=" ", and B=" ".

In a possible embodiment, Accept-Push-Policy: "urn:mpeg:dash:fdh:2016:push-fast-start" in the foregoing embodiment may be other information, for example. Accept-faceback-Policy: "urn:mpeg:dash:fdh:2016:cdn-prefetch" or faceback-Policy: "urn:mpeg:dash:fdh:2016:cdn-prefetch".

Accept-feedback-Policy or feedback-Policy: represents that the client may feed back a situation of viewing the VR video by the user to the server or a content delivery network (CDN); "urn:mpeg:dash:fdh:2016:cdn-prefetch" represents that the server or the CDN may estimate a change of the view point or the visual angle of the user by using feedback information, and obtain, from a head-end server to an edge server or a CDN node in advance, data to be requested by the user, thereby reducing an end-to-end delay of obtaining new viewpoint data by the client from a head end.

In a specific example, the media information obtaining request sent by the client to the server side is as follows:
Accept-faceback-Policy: "urn:mpeg:dash:fdh:2016: cdn-prefetch",
this represents that the client supports a data prefetching function of the server or the CDN, and the client may feed back information about the client to the CDN.

The server may send the following response to the client for the request:
faceback-Policy: "urn:mpeg:dash:fdh:2016:cdn-prefetch",
this represents that the server or the CDN supports the data prefetching function, and can accept the feedback information of the client.

In a specific example, the media information obtaining request sent by the client to the server side is as follows:
Accept-faceback-Policy: "urn:mpeg:dash:fdh:2016:cdn-prefetch"; type="viewpoint, FOV, projectType, and streamType",
this represents that the client supports Accept-faceback-Policy in feeding back data to the server or the CDN; "urn:mpeg:dash:fdh:2016:cdn-prefetch" represents the data fed back by the client supports the data prefetching function of the server or the CDN; type "viewpoint, FOV, projectType, and streamType" represents a type of data that can be fed back by the client. For example, the data type supported by the client includes the viewpoint the visual angle the projection mode the streaming mode.

For the request, a response of the server or the CDN may be:
faceback-Policy: "urn:mpeg:dash:2016:cdn-prefetch"; type="viewpoint",
this represents that the server supports only the viewpoint information.

In a specific example, the media information obtaining request sent by the client to the server is as follows:
Accept-faceback-Policy: "urn:mpeg:dash:fdh:2016:cdn-prefetch"; viewpoint="30,45",
this represents that viewpoint information led back by the client is the viewpoint information, and the viewpoint is "30,45".

In an embodiment, for the foregoing example information, the server may not send response information.

In a specific example, the media information obtaining request sent by the client to the server side is as follows:
Accept-faceback-Policy: "urn:mpeg:dash:fdh:2016:cdn-prefetch"; FOV="30,45,120,120". This represents that viewpoint information fed back by the client is the visual angle information, and the visual angle is "30, 45,120,120". The foregoing visual angle may alternatively be represented as FOV="30,45,120,120,2". 2 in the information represents the visual angle type. For example, the visual angle type represented by 2 is the visual angle described in FIG. 7.

In an embodiment, for the foregoing example information the server may not send response information.

In this embodiment, the client may further feed back other information, for example, the projection mode and the transmission mode. Details are not described herein again.

The server may send the following response to the client for the request:
faceback-Policy: "urn:mpeg:dash:fdh:2016:cdn-prefetch", this represents that the server or the CDN supports the data prefetching function, and can accept the feedback information of the client.

In an embodiment, the media information obtaining request sent by the client to the server side may be independently sent, or may be sent together with request segment data or request information of the media presentation description.

In a possible embodiment, the media presentation description in this embodiment of the present invention may be a file including index information of the video data. A format of the file may be an xml file constructed by using a standard protocol such as hyperText markup language (HTML); or may be a file constructed by using another proprietary protocol.

In a possible embodiment, the media presentation description may be a file obtained based on the MPEG-DASH standard.

In a possible embodiment, the video data in this embodiment of the present invention may include data of one or more frame pictures, may be raw data collected by a collective device, or may be data obtained after collected raw data is encoded. In an embodiment, collected raw data may be encoded by using an encoding standard such as ITU H.264 or ITU H.265. In an embodiment, the video data includes one or more media segments. In an example, the server prepares a plurality of versions of bitstreams for same video content. Each version of bitstream is referred to as a representation. The representation is a set and an encapsulation of one or more bitstreams in a transmission format. One representation includes one or more segments. Coding parameters, such as a bit rate and a resolution, of different versions of bitstreams may be different. Each bitstream is divided into a plurality of small files, and each small file is referred to as a segment. In a process in which the client requests media segment data, switch may be performed between different media representations. In an example, the server prepares three representations for a film, where the three representations include rep1, rep2, and rep3. rep1 is a high-definition video having a bit rate of 4 Mbps (i.e., megabit per second). rep2 is a standard-definition video having a bit rate of 2 Mbps, and rep3 is a standard-definition video having a bit rate of 1 Mbps. Segments of each representation may exist in a file in a head-to-tail manner, or may be independently stored as small files. The segment may be encapsulated based on a format in the standard ISO/IEC 14496-12 (ISO BMFF (Base Media File Format)), or may be encapsulated based on a format in ISO/IEC 13818-1 (MPEG-2 TS).

In an embodiment, the video data may alternatively be encapsulated according to a proprietary protocol. The video data may include media content having duration (for example, 5s), or may include only media content at a line point (for example, eleven o'clock fifty-nine minutes and ten seconds).

A second aspect of embodiments of this application provides a streaming media transmission client applied to a virtual reality technology. The client includes: a transmitter, configured to send a media information obtaining request to a server, where the media information obtaining request includes client capability information and auxiliary information, the client capability information indicates that the client supports reception of data pushed by the server, and the auxiliary information indicates an attribute that the client supports virtual reality presentation; and a receiver, configured to receive a media presentation description and media data, where the media presentation description and the media data are sent by the server after the server responds to the media information obtaining request.

In a possible embodiment of the present invention, the auxiliary information includes at least one of the following information: viewpoint information, visual angle information, projection mode information, and streaming mode information.

In a possible embodiment of the present invention, the visual angle information includes visual angle location information or visual angle type information.

In a possible embodiment of the present invention, a projection mode indicated by the projection mode information includes at least one of the following:
spherical projection, cylindrical projection, equirectangular projection, cubic projection, octahedral projection, icosahedral projection, equal-area projection, or segmented sphere projection.

In a possible embodiment of the present invention, a streaming mode indicated by the streaming mode information includes at least one of the following:
a tile mode or a full frame mode.

In a possible embodiment of the present invention, the media information obtaining request is an HTTP request.

In a possible embodiment of the present invention, the media information obtaining request includes uniform resource locator (URL) information, and the client capability information and the auxiliary information are parameters in the uniform resource locator information.

It may be understood that, embodiments corresponding to the foregoing method embodiments of the first aspect may be used as specific embodiments of the apparatus embodiments of the present invention and examples of related features. Details are not described herein again.

A third aspect of embodiments of this application discloses a streaming media transmission method applied to a virtual reality technology. The method includes:
receiving, by a server, a media information obtaining request sent by a client, where the media information obtaining request includes client capability information and auxiliary information, the client capability information indicates that the client supports reception of data pushed by the server, and the auxiliary information indicates an attribute that the client supports virtual reality presentation; and
sending, by the server, a media presentation description and media data to the client in response to the media information obtaining request.

In a possible embodiment of the present invention, the auxiliary information includes at least one of the following information:
viewpoint information, visual angle information, projection mode information, and streaming mode information.

In a possible embodiment of the present invention, the visual angle information includes visual angle location information or visual angle type information.

In a possible embodiment of the present invention, a projection mode indicated by the projection mode information includes at least one of the following:
spherical projection, cylindrical projection, equirectangular projection, cubic projection, octahedral projection, icosahedral projection, equal-area projection, or segmented sphere projection.

In a possible embodiment of the present invention, a streaming mode indicated by the streaming mode information includes at least one of the following:
a tile mode or a full frame mode.

In a possible embodiment of the present invention, the media information obtaining request is an HTTP request.

In a possible embodiment of the present invention, the media information obtaining request includes uniform resource locator (URL) information, and the client capability information and the auxiliary information are parameters in the uniform resource locator information.

For specific examples of the foregoing embodiments and feature explanations, refer to the corresponding embodiments of the first aspect. Details are not described herein again.

A fourth aspect of embodiments of this application discloses a streaming media transmission server applied to a virtual reality technology. The server includes:

- a receiver, configured to receive a media information obtaining request sent by a client, where the media information obtaining request includes client capability information and auxiliary information, the client capability information indicates that the client supports reception of data pushed by the server, and the auxiliary information indicates an attribute that the client supports virtual reality presentation; and
- a transmitter, configured to send a media presentation description and media data to the client in response to the media information obtaining request.

In a possible embodiment of the present invention, the auxiliary information includes at least one of the following information: viewpoint information, visual angle information, projection mode information, and or streaming mode information.

In a possible embodiment of the present invention, the visual angle information includes visual angle location information or visual angle type information.

In a possible embodiment of the present invention, a projection mode indicated by the projection mode information includes at least one of the following:

spherical projection, cylindrical projection, equirectangular projection, cubic projection, octahedral projection, icosahedral projection, equal-area projection, or segmented sphere projection.

In a possible embodiment of the present invention, a streaming mode indicated by the streaming mode information includes at least one of the following:

a tile (tile) mode or a full frame mode.

In a possible embodiment of the present invention, the media information obtaining request is an HTTP request.

In a possible embodiment of the present invention, the media information obtaining request includes uniform resource locator (URL) information, and the client capability information and the auxiliary information are parameters in the uniform resource locator information.

For specific examples of the foregoing embodiments, refer to corresponding embodiments of the embodiments in the third aspect and the first aspect. Details are not described herein again.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 10:
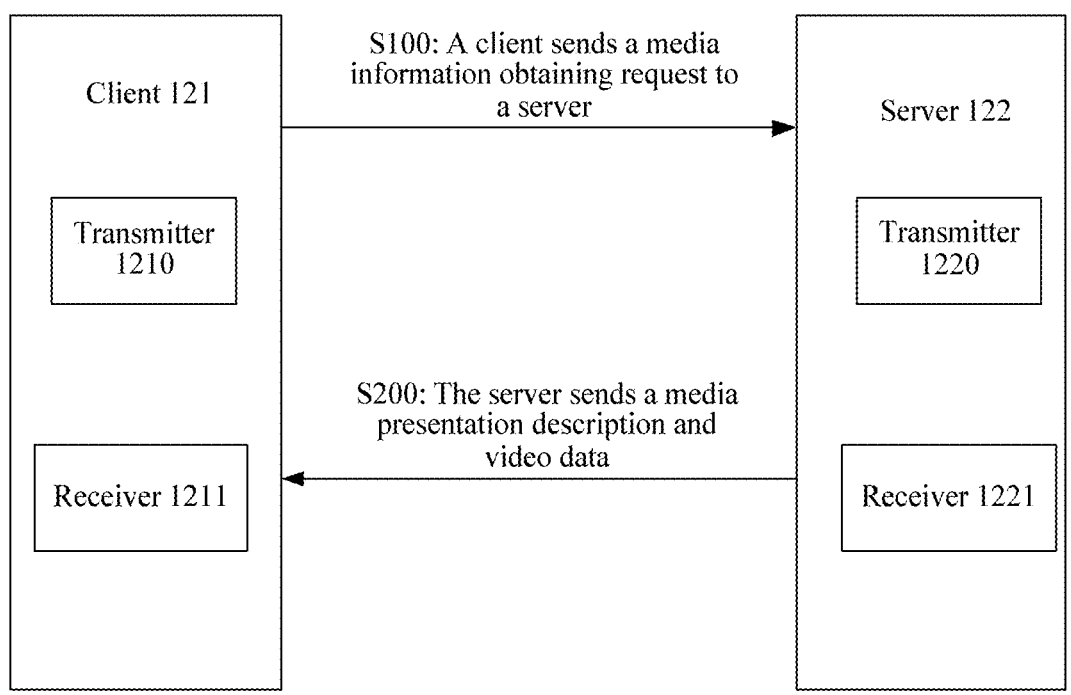
FIG. 10 is a schematic diagram of an implementation of streaming media transmission applied to a virtual reality technology according to an embodiment of the present invention.

The following describes a schematic diagram of an embodiment of streaming media transmission applied to a virtual reality technology according to an embodiment of the present invention with reference to FIG. 10.

As shown in FIG. 10, a client 121 includes a receiver 1211 and a transmitter 1210, and a server 122 includes a receiver 1221 and a transmitter 1220. The client 121 may further include another part such as a display or a processor that is not shown herein. The server 122 may further include a processor or the like that are not shown herein.

Step S100: The client sends a media information obtaining request to the server.

The client 121 may send the media information obtaining request to the server 122 by using the transmitter 1210.

The client 121 sends the media information obtaining request to the server 122. The media information obtaining request includes client capability information and auxiliary information. The client capability information indicates that the client supports reception of data pushed by the server, and the auxiliary information indicates an attribute that the client supports virtual reality presentation.

According to the streaming media transmission method in this embodiment of the present invention, the media information obtaining request sent by the client to the server includes the auxiliary information indicating that the client supports virtual reality representation. The server may determine corresponding media data based on the auxiliary information, and send the media data to the client, so that the client does not need to send a new request for the media data, to effectively reduce a transmission delay.

In a possible embodiment, the media information obtaining request includes uniform resource locator (URL) information, and the client capability information and the auxiliary information are parameters in the uniform resource locator information.

In a passible embodiment of the present invention, the client capability information may be information specified according to the ISO/IEC DIS 23009-6 Information technology—Dynamic adaptive streaming over HTTP (DASH)—Part 6: DASH with server push and websockets, for example, indication information indicating accepting of push or indication information indicating support in last push presentation.

In an example, an example of the client capability information included in the media information obtaining request is as follows:

Accept-Push-Policy: "urn:mpeg:dash:fdh:2016:push-fast-start"; type="video"; bitrate="2000000"; height="720"; B="5000000", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video; bitrate="2000000" represents that a bandwidth of the client is approximately but does not exceed 2 Mbps; height="720" represents that a resolution supported by the client does not exceed 720 pixels (pixels); B="5000000" represents that the client can receive a maximum of 5 Mbytes of media segment data.

In a possible embodiment of the present invention, the auxiliary information includes at least one of the following information: viewpoint information, visual angle information, projection mode information, and or streaming mode information.

In a possible embodiment of the present invention, the viewpoint information or the visual angle information may be carried in a fast presentation parameter set (FastStart-Params) sent by the client 121 to the server 122, or may be carried in a uniform resource locator (URL) parameter. For example, a parameter whose parameter name is viewpoint, FOV, or ROI is added to represent the viewpoint or the visual angle. A value of viewpoint may be the information about the point P in the foregoing embodiment. Information about FOV or ROI may be description information of the visual angle in the foregoing embodiment.

In an example of an embodiment of the present invention, an example of a media obtaining request sent by the client 121 to the server 122 is as follows:

Accept-Push-Policy: "urn:mpeg:dash:fdh:2016:push-fast-start"; type="video"; bitrate="2000000"; height="720"; B="5000000"; viewpoint="30,45", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video; bitrate="2000000" represents that a bandwidth of the client is approximately but does not exceed 2 Mbps; height="720" represents that a resolution supported by the client does not exceed 720 pixels; B="5000000" represents that the client can receive a maximum of 5 Mbytes of media segment data; and viewpoint="30,45" is the viewpoint information, and represents viewpoint coordinates of the user.

The server 122 may make the following response for the request of the client 121:

Push-Policy: "urn:mpeg:dash:fdh:2016:push-fast-start"; type="video"; bitrate="1800000"; B="3000000"; viewpoint="30,45", where Push-Policy represents that the server supports in pushing data to the client; "urn:mpeg:dash:fdh:2016:push-fast-start" represents that the data pushed by the server to the client supports fast presentation of the client; type "video" represents that a type of the pushed data is a video; bitrate="1800000" represents a bandwidth of pushed data is 1.8 Mbps; B="3000000" represents that the pushed data is 3 Mbytes of media segment data; and viewpoint="30,45" is the viewpoint information, and represents that the pushed data covers the viewpoint coordinates. In a scenario in which the client starts to view the VR video or the user switches the visual angle, the viewpoint information or the visual angle information is added to the request, so that the server can fast determine a representation or video data that is needed by the client, to perform pushing to the client, reduce a quantity of requests of the client, and effectively reduce a delay.

In an example of an embodiment of the present invention, an example of a media obtaining request sent by the client 121 to the server 122 is as follows:

Accept-Push-Policy: "urn:mpeg:dash:fdh:2016:push-fast-start"; type="video"; bitrate="2000000"; height="720"; B="5000000"; FOV="30,45,120,120", where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video; bitrate="2000000" represents that a bandwidth of the client does not exceed 2 Mbps; height="720" represents that a resolution supported by the client does not exceed 720 pixels; B="5000000" represents that the client can receive a maximum of 5 Mbytes of media segment data; and FOV="30,45,120,120" is the visual angle information, and represents the visual angle range of the user.

Figure 1:
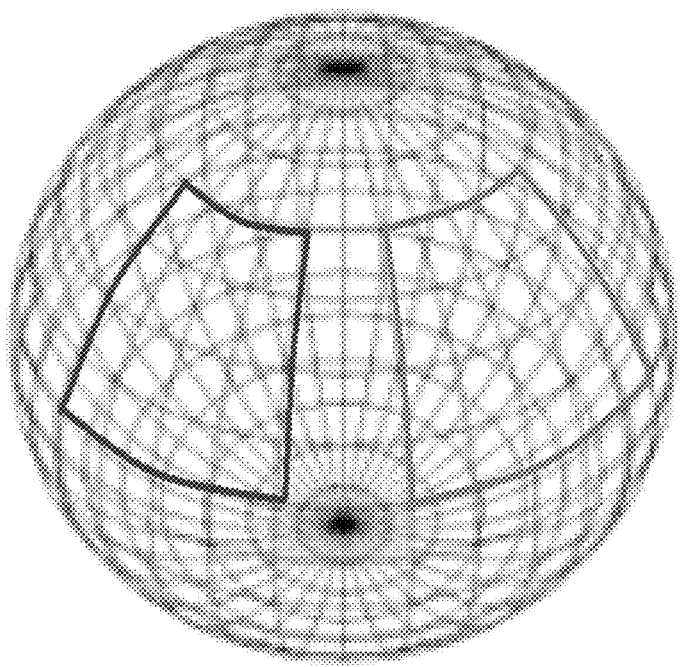
FIG. 1 is a schematic diagram of visual angle space when a user views a 360-degree video according to an embodiment of the present invention.
Figure 2:
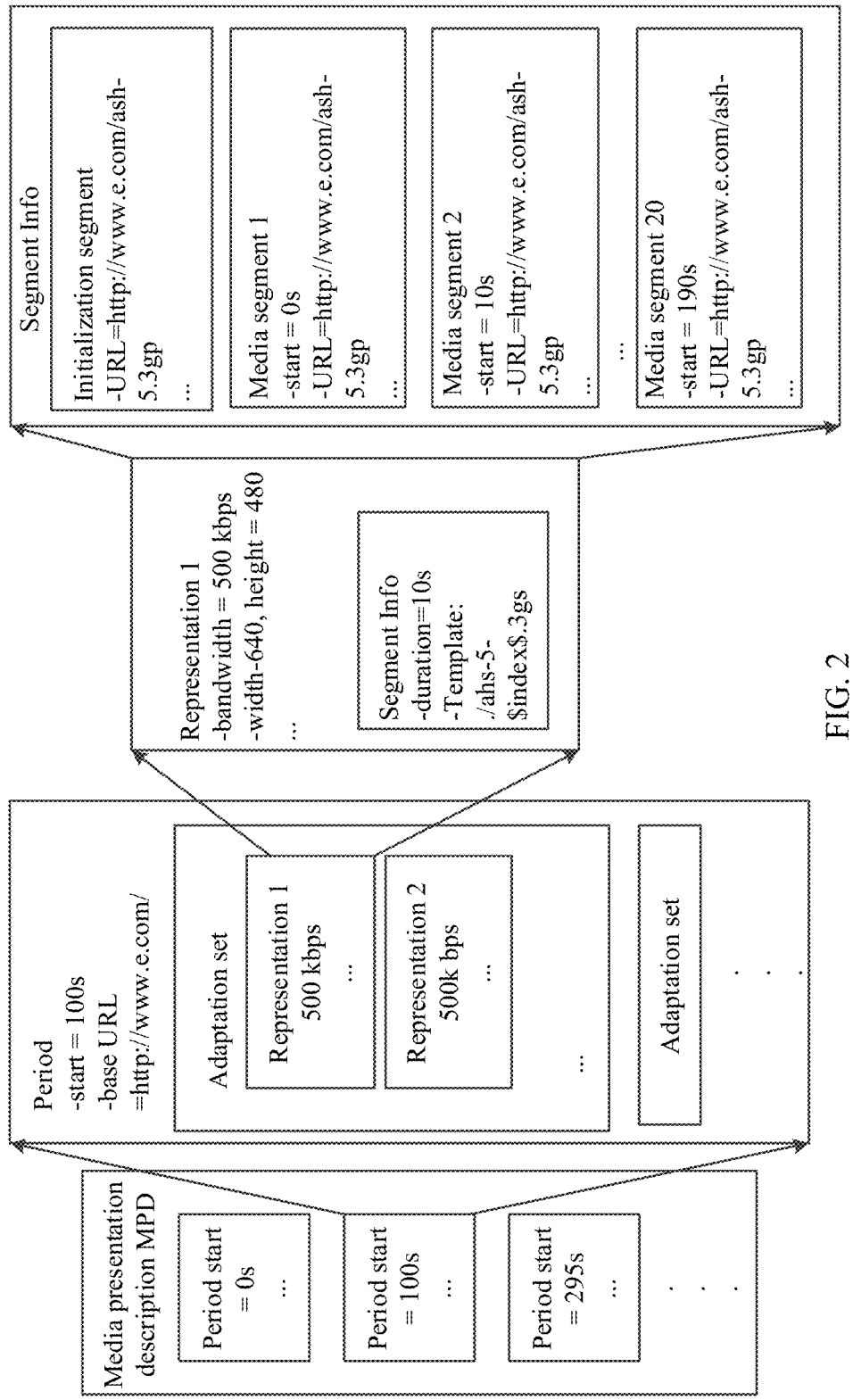
FIG. 2 is a schematic structural diagram of a media presentation description when streaming media transmission is performed according to MPEG-DASH according to an embodiment of the present invention.
Figure 3:
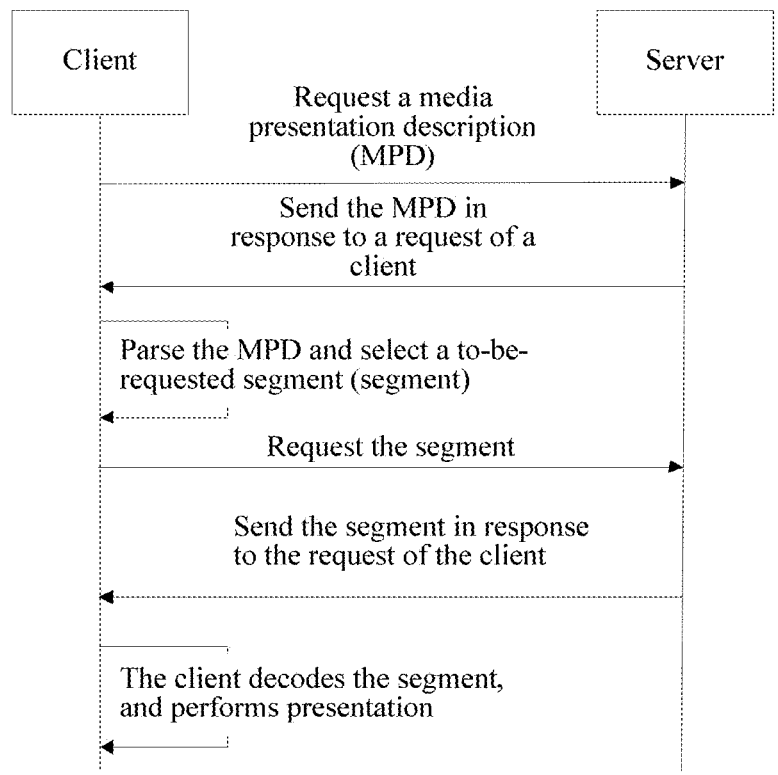
FIG. 3 is a schematic flowchart of a prior video data transmission method based on a streaming media technology.
Figure 4:
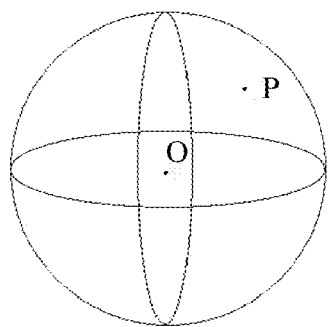
FIG. 4 is a schematic diagram of a viewpoint of an implementation according to an embodiment of the present invention.
Figure 5:
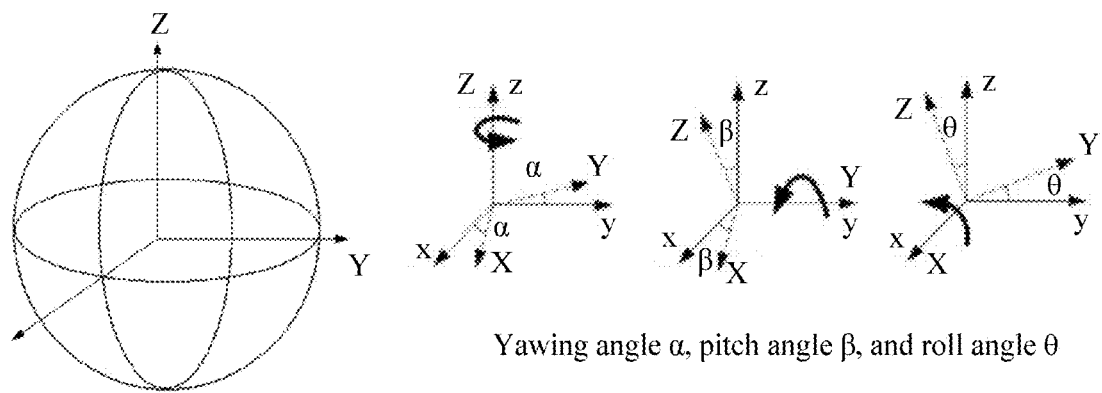
FIG. 5 is a schematic diagram of a yawing angle, a pitch angle, and a roll angle of an implementation according to an embodiment of the present invention.
Figure 6:
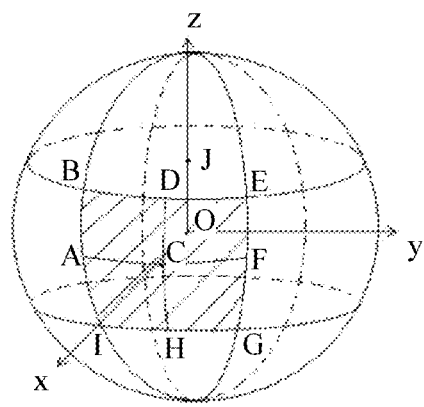
FIG. 6 is a schematic diagram of a visual angle of an implementation according to an embodiment of the present invention.
Figure 7:
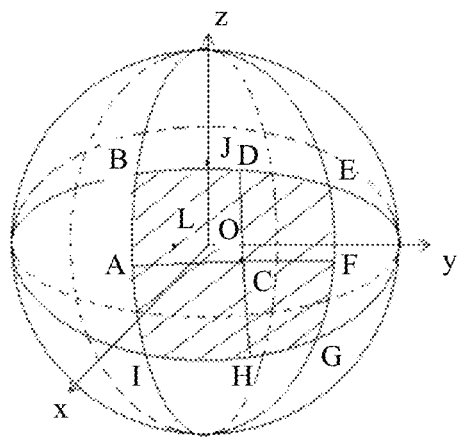
FIG. 7 is a schematic diagram of a visual angle of another implementation according to an embodiment of the present invention.
Figure 8:
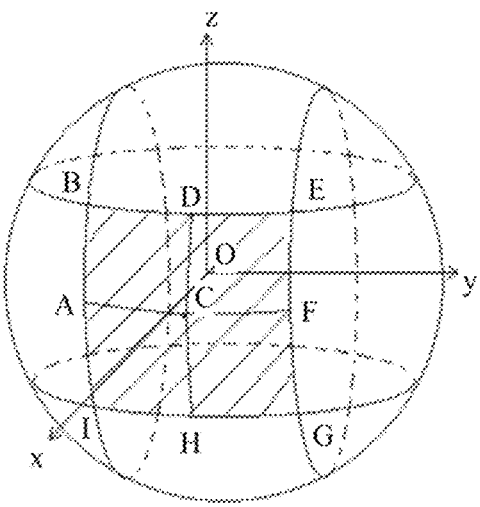
FIG. 8 is a schematic diagram of a visual angle of another implementation according to an embodiment of the present invention.

The server 122 may make the following response for the request of the client 121:

Push-Policy: "urn:mpeg:dash:fdh:2016:push-fast-start"; type="video"; bitrate="1800000"; B="3000000"; FOV="30,45,120,120", where Push-Policy represents that the server supports in pushing data to the client; "urn:mpeg:dash:fdh:2016:push-fast-start" represents that the data pushed by the server to the client supports fast presentation of the client; type="video" represents that a type of the pushed data is a video; bitrate="1800000" represents a bandwidth of pushed data is 1.8 Mbps; B="3000000" represents that the pushed data it 3 Mbytes of media segment data; and FOV="30,45,120,120" represents the visual angle information, 30 and 45 are center point information of the visual angle, and 120 and 120 are a width and a height of the visual angle; the foregoing visual angle may also be represented as FOV="30,45, 120,120,2", 2 in the information represents a visual angle type, for example, the visual angle type represented by 2 is the visual angle described in FIG. 7.

The client 121 may send a projection mode supported by the client to the server 122. In a VR video, each VR frame is a spherical surface. However, existing encoding and processing technologies are all performed based on a plane. Therefore, before a spherical VR frame is encoded, a spherical surface is mapped into a plane. A typical projection mode includes equirectangular projection, cubic projection, cylindrical projection, and the like.

In a possible embodiment, an added parameter name may be projectType, and a value of the parameter may be an English full name of the projection mode, or may be an abbreviation, or may be a pre-defined code word.

In a specific example, the media information obtaining request sent by the client 121 to the server 122 is as follows:
Accept-Push-Policy: "urn:mpeg:dash:fdh:2016:push-fast-start", type="video"; bitrate="2000000"; height="720"; B="5000000"; projectType="cube,erp",
where Accept-Push-Policy represents that the client may have a capability to receive information pushed by the server; urn:mpeg:dash:fdh:2016:push-fast-start represents that the client supports fast presentation in a push form; type="video" represents that a type of data requested by the client is a video: bitrate="2000000" represents that a bandwidth of the client is approximately but does not exceed 2 Mbps; height="720" represents that a resolution supported by the client does not exceed 720 pixels; B="5000000" represents that the client can receive a maximum of 5 Mbytes of media segment data; and projectType="cube,erp" is the projection mode information, and represents the projection mode supported by the client. In this example, the projection mode is cubic projection and equirectangular projection.

The server 122 may send the following response to the client 121 for the request:
Push-Policy: "urn:mpeg:dash:fdh:2016:push-fast-start"; type="video"; bitrate="1800000"; B="3000000"; projectType="erp",
where Push-Policy represents that the server supports in pushing data to the client; "urn:mpeg:dash:fdh:2016:push-fast-start" represents that the data pushed by the server to the client supports fast presentation of the client; type="video" represents that a type of the pushed data is a video; bitrate="1800000" represents a bandwidth of pushed data is 1.8 Mbps; B="3000000" represents that the pushed data is 3 Mbytes of media segment data; and projectType="erp" represents that the projection mode of the data is equirectangular projection.

The projection mode information is added to information sent by the client to the server, so that when there are a plurality of projection mode representations in the server, the server can fast determine a projection mode representation supported by the client, and push data of the representation to the client, thereby reducing a delay of interaction between the client and the server.

In a possible embodiment of the present invention, a streaming mode indicated by the streaming mode information includes at least one of the following modes: a tile mode or a full frame mode.

The client sends a streaming mode supported by the client to the server. During transmission of the VR video, there may be two video stream transmission modes. In one mode, content of a VR video frame is all transmitted to the client (the full frame mode). In the other mode, content of the VR video is divided into a plurality of tiles, and corresponding content of each tile is independently encoded (the tile mode). During transmission, a representation of a tile of content related to the visual angle of the client may be sent to the client. A division manner may be shown in FIG. 9. In an embodiment, the server may simultaneously transmit data of a low-quality and complete VR video frame and data of at least one high-quality tile.

In a possible embodiment, an added parameter name may be streamType, and a value of the parameter may be an English full name of the transmission mode, or may be an abbreviation, or may be a pre-defined code word.

In a specific example, an example of the media information obtaining request sent by the client 121 is as follows:
Accept-Push-Policy: "urn:mpeg:dash:fdh:2016:push-fast-start"; type="video"; bitrate="2000000"; height="720"; B="5000000"; streamType="tile".

The client requests video data from the server. A quantity of requested bytes is 5 MBytes, a maximum requested resolution is 720 p, and a maximum bit rate is 2 Mbps. The transmission mode that can be supported by the client is the tile mode.

The server 122 may send the following response to the client 121 for the request:
Push-Policy: "urn:mpeg:dash:fdh:2016:push-fast-start"; type="video"; bitrate="1800000"; B="3000000"; streamType="tile".

The server sends 3 MBytes of video data to the client. The bit rate is 1.8 Mbps, and transmitted data is tile data.

The streaming mode information is added to the request sent by the client to the server, so that when the server supports a plurality of streaming modes, the server can fast determine a streaming mode representation that can be supported by the client, and push data of the representation to the client, thereby reducing a delay of interaction between the client and the server.

In a possible embodiment, request information of the client may not carry one or more pieces of information of type=" ", bitrate=" ", and B=" ".

Step S200: The server sends a media presentation description and video data.

The receiver 1221 of the server 122 receives the media information obtaining request. The server 122 sends the media presentation description and media data to the client 121 in response to the media information obtaining request by using the transmitter 1220.

In an embodiment, after obtaining the viewpoint information or the visual angle information of the client, the server selects a representation related to the viewpoint information or the visual angle information. The representation related to the viewpoint information or the visual angle information is a representation of a space video corresponding to the viewpoint or the visual angle, or is a tile representation related to the viewpoint information/the visual angle information, or is an omnidirectional VR video (namely, a 360-degree video). Video data of an omnidirectional VR video may be divided into a plurality of tiles, each tile is described by using a tile representation after the tile is independently encoded, and video data corresponding to the tile representation is a part of the data of the omnidirectional VR video.

Figure 9:
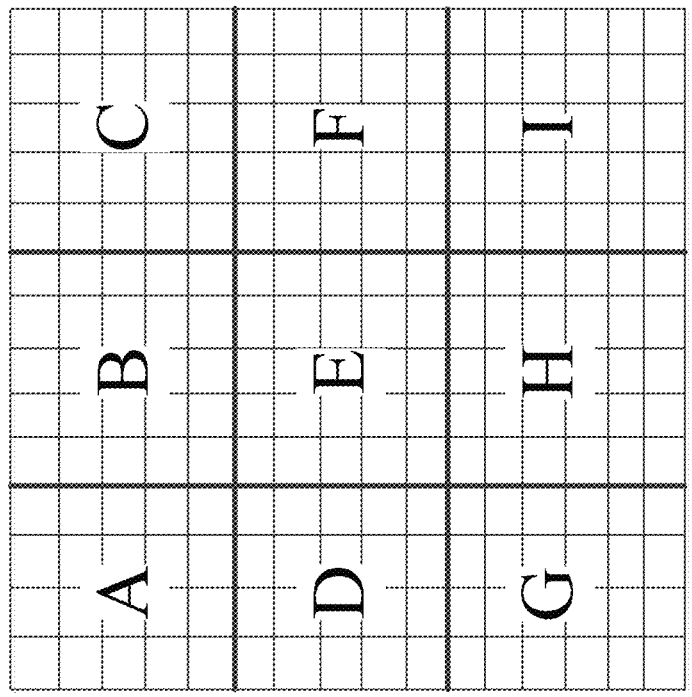
FIG. 9 is a schematic diagram of tile (tile) division based on equirectangular projection according to an embodiment of the present invention.
Figure 9:
Figure 9:
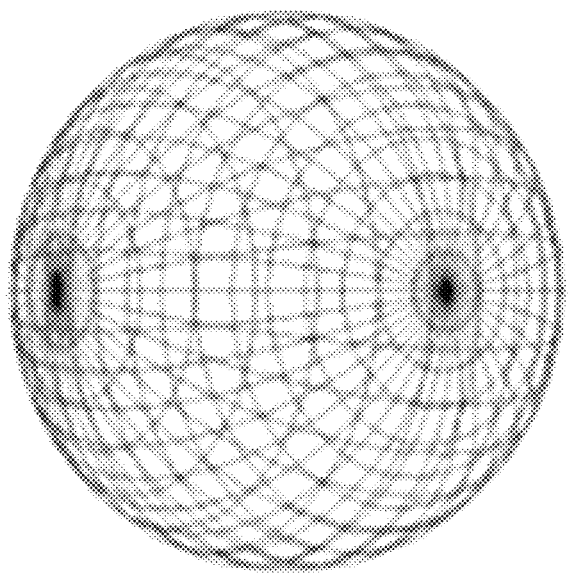

When VR video content is prepared, the server may encode all frames of the VR video. Video quality of a partial region in the encoded frames may be high quality. Alternatively, VR video frames may be divided into a plurality of tiles, and each tile is a part of space region in the VR video. During encoding, a representation is independently prepared for each tile. The server selects representations of one or more tiles related to the viewpoint or the visual angle. Tile division in the VR video may be shown in FIG. 9. In FIG. 9, a spherical space region is first mapped into a plane, and lien the plane is divided into nine space regions. There have been a plurality of manners in which a spherical surface is mapped into a plane. In an example in FIG. 9, the tile division is described by using only equirectangular projection. In the prior art, another existing projection mode also supports the tile division, and details are not described herein. After determining the representation, the server sends some data of the representation or data in a period of time to the client.

After receiving the media presentation description and the video data, the client 121 may perform different operations based on the media presentation description or the video data, for example, presentation, storage, or sending a new request. For a specific processing manner, refer to a processing manner in prior systems. Details are not described herein.

It may be understood that, implementations corresponding to the foregoing method embodiments may be used as specific implementations of the embodiments of the client and the server in the present invention and examples of related features. Details are not described herein again.

It should be noted that, to make the description brief, the foregoing method embodiments are expressed as a series of actions. However, a person skilled in the an should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the an may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory ROM), or a random access memory (RAM).

What is claimed is:

1. A streaming media transmission method applied to a virtual reality technology, comprising:
    sending, by a client, a media information obtaining request to a server, wherein the media information obtaining request comprises client capability information and auxiliary information, the client capability information indicates that the client supports reception of data pushed by the server, the auxiliary information indicates an attribute that the client supports virtual reality presentation, and the auxiliary information comprises a presentation parameter set that includes at least viewpoint information, visual angle information, and at least one of projection mode information or streaming mode information; and
    in response to the media information obtaining request, receiving, by the client, a media presentation description and media data, wherein the media presentation description and the media data are sent by the server after receipt of the media information obtaining request, and wherein the media data is selected by the server based at least in part on the presentation parameter set in the auxiliary information.

2. The transmission method according to claim 1, wherein the visual angle information comprises visual angle location information or visual angle type information.

3. The transmission method according to claim 1, wherein a projection mode indicated by the projection mode information comprises at least one:
    spherical projection, cylindrical projection, equirectangular projection, cubic projection, octahedral projection, icosahedral projection, equal-area projection, or segmented sphere projection.

4. The transmission method according to claim 1, wherein a streaming mode indicated by the streaming mode information comprises at least one of:
    a tile mode or a full frame mode.

5. The transmission method according to claim 1, wherein the media information obtaining request is a hypertext transfer protocol (HTTP) request.

6. The transmission method according to claim 1, wherein the media information obtaining request comprises uniform resource locator (URL) information, and the client capability information and the auxiliary information are parameters in the URL information.

7. A streaming media transmission method applied to a virtual reality technology, comprising:
    receiving, by a server, a media information obtaining request sent by a client, wherein the media information obtaining request comprises client capability information and auxiliary information, the client capability information indicates that the client supports reception of data pushed by the server, the auxiliary information indicates an attribute that the client supports virtual reality presentation, and the auxiliary information comprises a presentation parameter set that includes at least viewpoint information, visual angle information, and at least one of projection mode information or streaming mode information; and
    sending, by the server, a media presentation description and media data to the client in response to the media information obtaining request, wherein the media data is selected by the server based at least in part on the presentation parameter set in the auxiliary information.

8. The transmission method according to claim 7, wherein the visual angle information comprises visual angle location information or visual angle type information.

9. The transmission method according to claim 7, wherein a projection mode indicated by the projection mode information comprises at least one:
    spherical projection, cylindrical projection, equirectangular projection, cubic projection, octahedral projection, icosahedral projection, equal-area projection, or segmented sphere projection.

10. The transmission method according to claim 7, wherein a streaming mode indicated by the streaming mode information comprises at least one of:
    a tile mode or a full frame mode.

11. The transmission method according to claim 7, wherein the media information obtaining request is a hypertext transfer protocol (HTTP) request.

12. The transmission method according to claim 7, wherein the media information obtaining request comprises uniform resource locator (URL) information, and the client capability information and the auxiliary information are parameters in the URL information.

13. A streaming media transmission client applied to a virtual reality technology, comprising:
 a transmitter configured to send a media information obtaining request to a server, wherein the media information obtaining request comprises client capability information and auxiliary information, the client capability information indicates that the client supports reception of data pushed by the server, the auxiliary information indicates an attribute that the client supports virtual reality presentation, and the auxiliary information comprises a presentation parameter set that includes at least viewpoint information, visual angle information, and at least one of projection mode information or streaming mode information; and
 a receiver configured to, in response to the media information obtaining request, receive a media presentation description and media data, wherein the media presentation description and the media data are sent by the server after receipt of the media information obtaining request, and wherein the media data is selected by the server based at least in part on the presentation parameter set in the auxiliary information.

14. The client according to claim 13, wherein the visual angle information comprises visual angle location information or visual angle type information.

15. The client according to claim 13, wherein a projection mode indicated by the projection mode information comprises at least one:
 spherical projection, cylindrical projection, equirectangular projection, cubic projection, octahedral projection, icosahedral projection, equal-area projection, or segmented sphere projection.

16. The client according to claim 13, wherein a streaming mode indicated by the streaming mode information comprises at least one of the following modes:
 a tile mode or a full frame mode.

17. The client according to claim 13, wherein the media information obtaining request is a hypertext transfer protocol (HTTP) request.

18. The client according to claim 13, wherein the media information obtaining request comprises uniform resource locator (URL) information, and the client capability information and the auxiliary information are parameters in the URL information.

* * * * *